Figure 1:
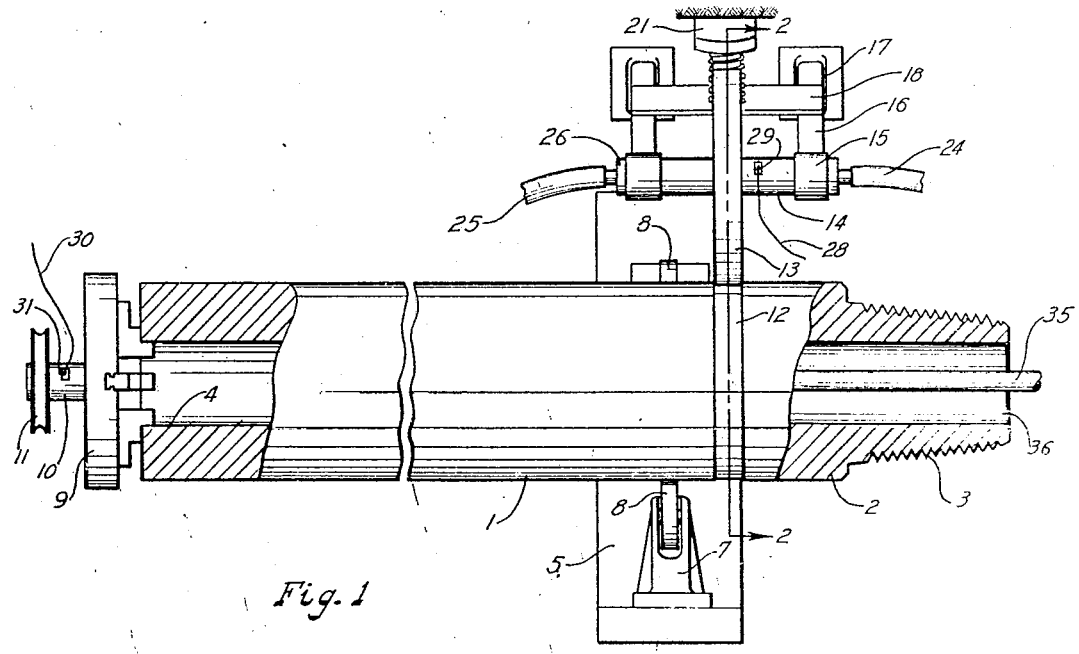

May 4, 1943. F. C. SMITH, JR 2,318,263
METHOD OF SECURING HARD FACING MATERIAL TO TUBULAR MEMBERS
Filed Nov. 8, 1941

Frederick C Smith Jr.  INVENTOR
BY Jesse R. Stone
ATTY.

Patented May 4, 1943

2,318,263

UNITED STATES PATENT OFFICE 2,318,263

METHOD OF SECURING HARD FACING MATERIAL TO TUBULAR MEMBERS

Frederick C. Smith, Jr., Houston, Tex., assignor to Hughes Tool Company, Houston, Tex., a corporation of Delaware Application November 8, 1941, Serial No. 418,319

1 Claim. (Cl. 219—10)

The invention relates to the hard facing of drill pipe and tool joints and similar tubular members employed in drilling wells.

In the rotation of the drill stem and the drill in drilling operations the outer surface of the tool joints and the stem are subjected to the abrasive action of the material in the wall of the well as the drill stem rotates relative thereto. As the tool joints are ordinarily of larger outer diameter than are the drill pipe sections they bear more heavily against the wall of the hole and are subjected to greater wear.

This wear may be reduced materially by the facing of the outer periphery of the pipe with hard material resistant to wear, such as tungsten carbide for example. It has been found that the hard metal may be secured most effectively to the pipe when it is secured in a groove circumferentially around the periphery of the joint. The usual method of securing hard material in position includes the operation of a skilled welder with a welding rod and an electric arc or an oxyacetylene torch. The use of skilled labor for this purpose makes the cost of the hard facing of a tool somewhat excessive.

It is an object of this invention to provide a method of securing the hard material in position upon the joint in a most economical manner and without the necessary use of skilled labor.

I desire to mechanically apply the hard facing material in position upon the tool joint in such manner that a minimum of expense will be involved.

It is a further object to apply a hard facing material to a finished tool joint without any material change in the quality of the steel of the tool joint or the hard facing due to the heat of application.

My invention will be more clearly understood by reference to the drawing and the description thereof which follows:

In the drawing Fig. 1 is a top plan view partly in broken section illustrating the arrangement of my apparatus for hard facing the joint, the feeding mechanism for the hard material being broken away for greater clearness.

Figure 2:
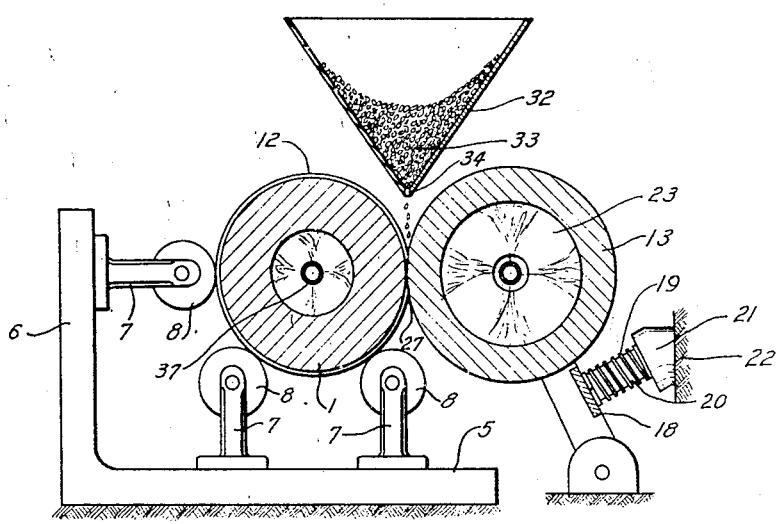

Fig. 2 is a transverse section taken on the line 2—2 of Fig. 1 and showing the feeding mechanism in position for delivering the hard material to the work.

In the drawing the pipe or tool joint upon which the hard facing material is to be secured is shown at 1. This pipe section has a tool joint 2 integrally secured thereto, said tool joint having its end tapered and threaded at 3 for attachment to an additional section of pipe. The other end of the section upon which the tool joint is formed is shown at 4 to be unthreaded, it being understood, however, that a thread may be formed at this end for attachment to the next adjacent section.

The tool joint is mounted for rotation upon a supporting base 5, said base having an upstanding post 6 at one end thereof. Upon this base are secured a plurality of brackets 7 which serve as supports for rollers 8, which are positioned to rotatably engage the joint member 1.

Rotation is communicated to the joint section by means of a chuck member 9 mounted for rotation in any desired manner not shown. A shaft 10 on said chuck is rotatable by any desired means and a pulley 11 on said shaft is shown as one means for communicating rotation to the shaft and the chuck.

A circumferential groove 12 is formed in the outer periphery of the joint to receive the hard facing material. A pressure wheel 13 of approximately the same width as said groove is positioned to bear against the bottom of the groove. Said wheel is mounted upon a hollow shaft 14 supported in bearings 15, said bearings being formed upon arms 16 pivotally secured to base members 17. A cross arm 18 connects the two arms 16 and a spring 19 mounted upon a guide rod 20 bears against said cross arm 18 and tends to force the shaft 14 and the wheel 13 strongly against the bottom of the groove 12. The end of the guide rod and the spring bears against a block 21 which is fixed to a support indicated diagrammatically at 22. It will be understood that the wheel bears with some force against the pipe and, when said pipe is rotated, rotation will thus be communicated to the wheel.

The shaft 14 is hollow and the interior of the wheel 13 is also provided with a chamber 23 to receive a cooling fluid which is discharged through said shaft and radially outwardly against the interior wall of the chamber. Said fluid may be forced into the shaft by way of a flexible pipe 24 and outwardly therefrom through a pipe 25. It will be understood that the connection between the two pipes 24 and 25 with the rotating shaft 14 is by way of a swivel connection 26 of ordinary construction which need not be further illustrated.

It is desired to heat the particles of hard metal and the pipe at the point of contact between the pipe and wheel, as indicated at 27. This heating operation is performed electrically. A conducting cable 28 is secured at 29 to the shaft 14, which will be made of conducting material. The shaft may be insulated from the supporting arms 16 by any preferred means, such as insulating sleeves, within the bearings 15. The pipe member 1 is also connected in the circuit by means of a cable 30 secured to a post 31 on the shaft 10. It will thus be seen that the current may flow from the wheel to the particles at the bottom of the groove at the point of contact and it is desired that the pipe be rotated at a fairly rapid rate so that the application of heat to the pipe and particles will be an instantaneous one. The strength of the current passing through this circuit will be sufficient to heat up the bottom of the groove sufficiently to melt a film of steel at the instant of contact. The tungsten carbide particles being of much higher melting point will not be materially affected by the heat, except at point of contact with the pipe, this being the point of greatest electrical resistance.

The metal being fed into this groove may be delivered in any desirable manner. I have shown a hopper 32 positioned directly above the point of contact of the wheel with the pipe. Particles of hard material 33 in said hopper are fed through an opening 34 into the cylindrical recess upon the joint of pipe. The rotation of the pipe and the wheel will carry the particles of hard material into contact with the molten film at the bottom of the groove and embed and fuse the said particles into the groove.

The particles of tungsten carbide will be fairly small and it is contemplated two or more rotations of the pipe will be necessary to build up in the groove 12 sufficient hard metal to come approximately flush with the surface of the joint.

In order that the metal of the wheel and the pipe joint be not overheated I contemplate cooling the pipe as well as the wheel. To do this a water pipe 35 is mounted to extend axially into the passage 36 in the joint and a nozzle 37 is provided adjacent the end of said pipe to spray the water pumped therein radially outwardly toward the inner wall of the pipe at a point opposite the groove 12.

It will be understood that the metal of the wheel 13 will have comparatively high electrical conductivity and be water cooled so that the heat generated at the point of contact between the wheel and the pipe will be insufficient to affect the metal of the wheel. However, the steel of the joint member will melt at a sufficiently low temperature that a film of molten steel will be formed thereon by the passage of the current across the space between the hard metal particles and the joint.

When the device is constructed and operated in the manner suggested it will be possible to apply the tungsten particles in the groove in a manner which is almost automatic. The necessity of a skilled welder to operate the device will be avoided and the cost of application of the hard material will be comparatively small. The advantages of this construction will be understood by those skilled in the art.

While my invention is illustrated as applied to tubular members to which it is best adapted for use, it will be obvious that it is applicable to more general uses and I do not wish to be limited to the use of the invention upon such members, nor is the groove necessary in the pipe joint except as a convenient means of confining the particles of hard facing material so they will pass under the wheel at the point of contact.

What is claimed as new is:

A method of hard facing a steel tool joint member for use in well drilling, said member having a cylindrical outer surface adapted to contact with the wall of the well, comprising forming a groove in said member circumferentially about the same, mounting an electrically conducting pressure wheel to fit resiliently into said groove, feeding granulated hard metal of comparatively high melting point relative to said steel into said groove, rotating said member and said wheel to force said hard metal into said groove and simultaneously passing an electric current from said wheel to said member thereby instantaneously heating the steel in the bottom and side walls of said groove at the point of contact of said wheel and member to melt only the surface of said groove and attach said hard unmelted particles in position, and simultaneously cooling the interior of said member, whereby a band of wear resting metal is firmly embedded in said groove.

FREDERICK C. SMITH, Jr.

CERTIFICATE OF CORRECTION.

Patent No. 2,318,263.   May 4, 1943.

FREDERICK C. SMITH, JR.

It is hereby certified that error appears in the printed specification of the above numbered patent requiring correction as follows: Page 2, second column, line 46, for "resting" read --resisting--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.